Aug. 7, 1956 R. C. BROWN 2,757,448

METHOD AND APPARATUS FOR ASSEMBLING SPRING CLOTHESPINS

Filed Feb. 11, 1953

INVENTOR

ROBERT C. BROWN

BY KARL W. FLOCKS

ATTORNEY

Aug. 7, 1956 R. C. BROWN 2,757,448
METHOD AND APPARATUS FOR ASSEMBLING SPRING CLOTHESPINS
Filed Feb. 11, 1953 11 Sheets-Sheet 2
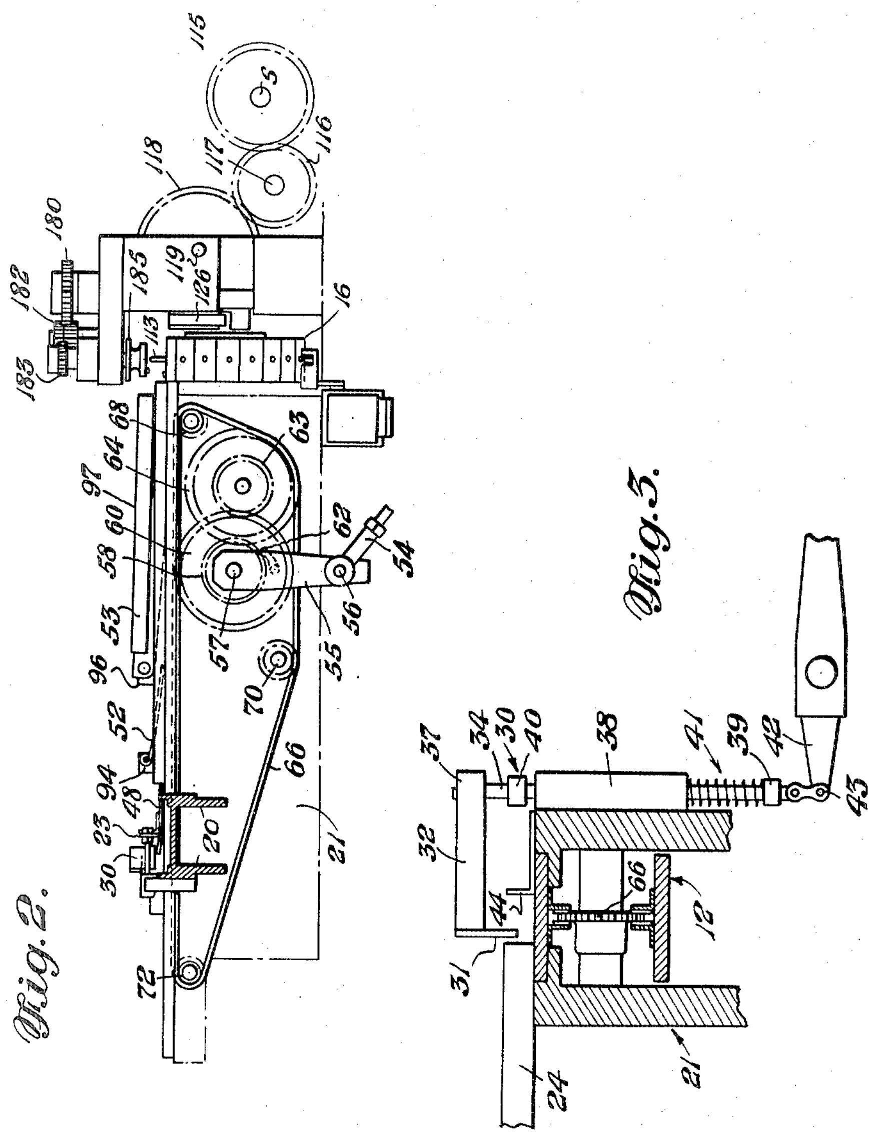
INVENTOR
ROBERT C. BROWN
BY KARL W. FLOCKS
ATTORNEY Aug. 7, 1956 R. C. BROWN 2,757,448
METHOD AND APPARATUS FOR ASSEMBLING SPRING CLOTHESPINS
Filed Feb. 11, 1953 11 Sheets-Sheet 3
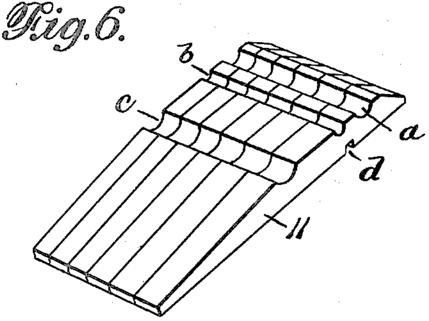
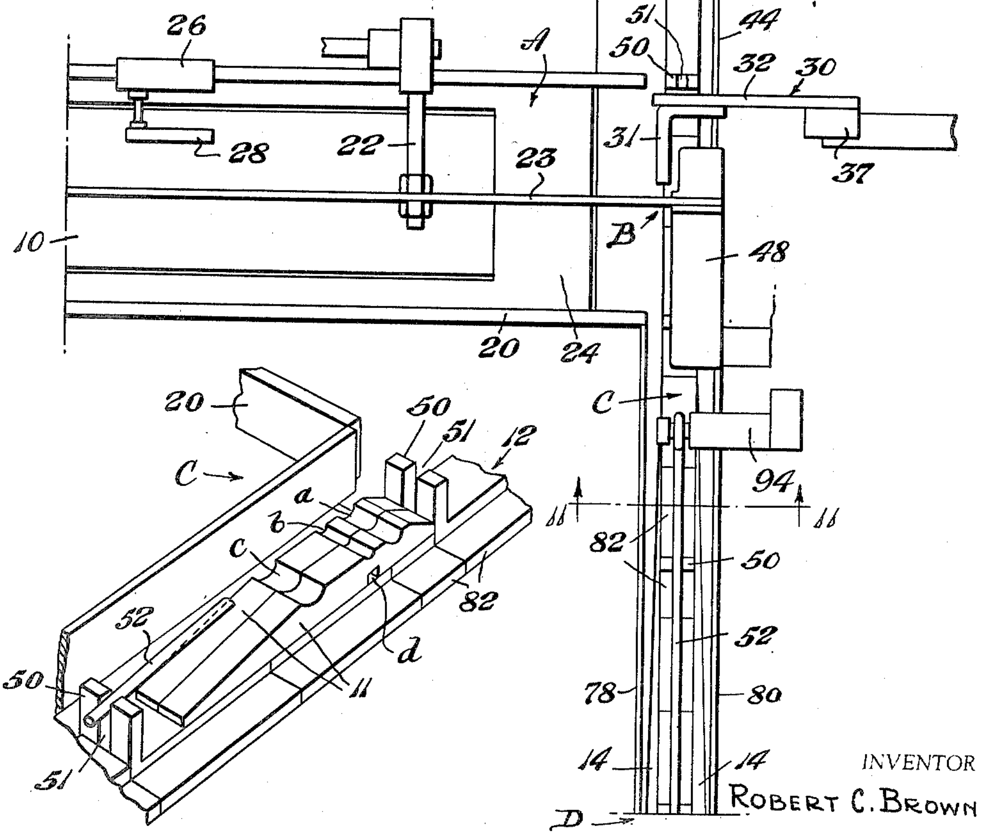
INVENTOR
ROBERT C. BROWN,
BY KARL W. FLOCKS
ATTORNEY METHOD AND APPARATUS FOR ASSEMBLING SPRING CLOTHESPINS
Filed Feb. 11, 1953
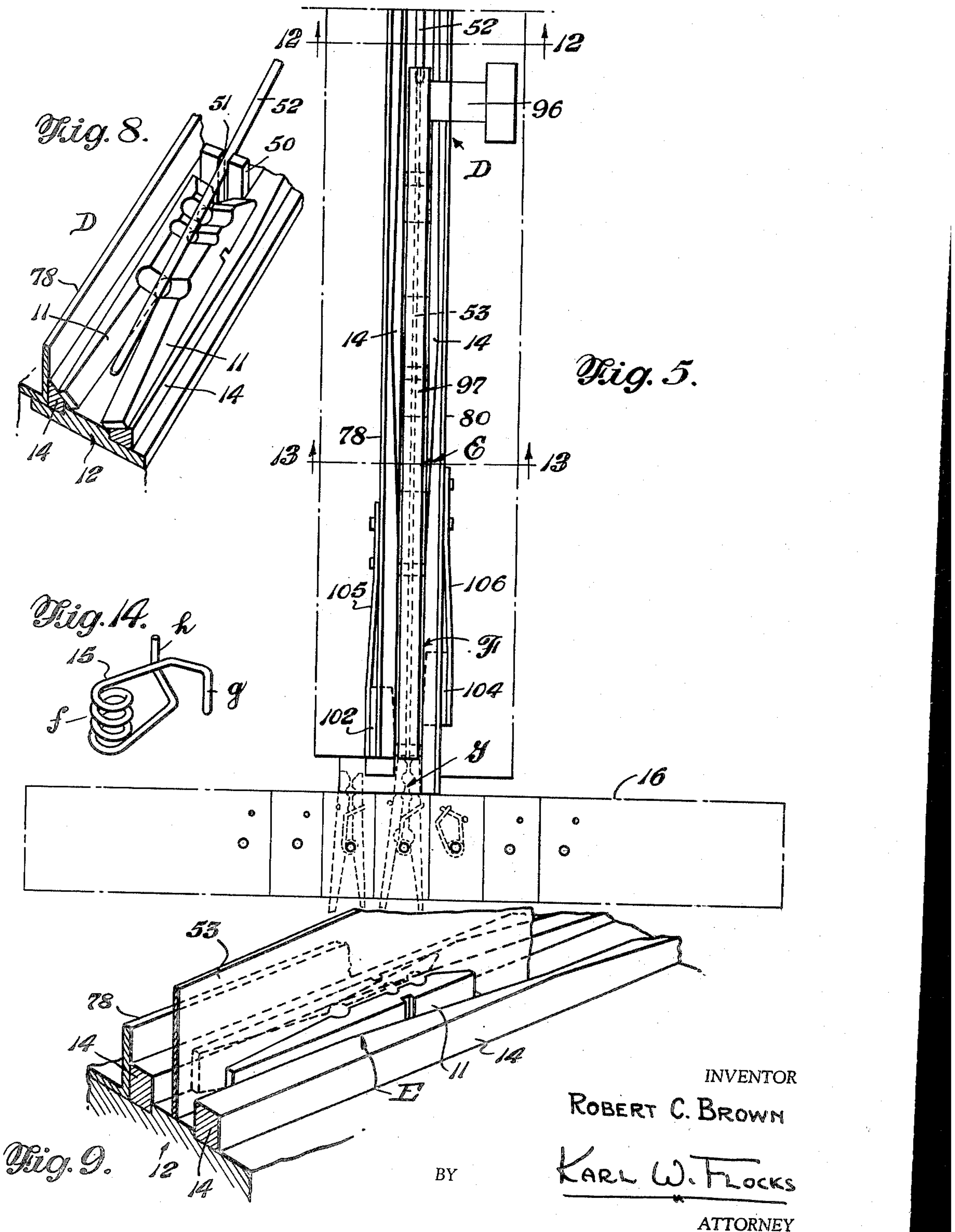
INVENTOR
ROBERT C. BROWN
BY KARL W. FLOCKS
ATTORNEY Aug. 7, 1956 R. C. BROWN 2,757,448
METHOD AND APPARATUS FOR ASSEMBLING SPRING CLOTHESPINS
Filed Feb. 11, 1953 11 Sheets-Sheet 5
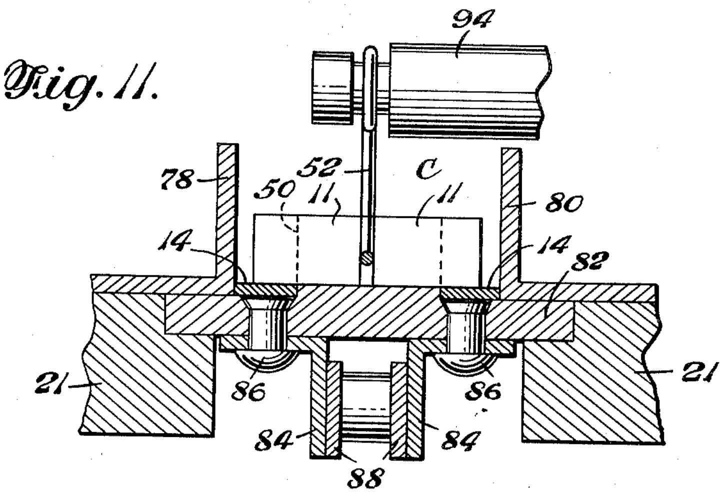
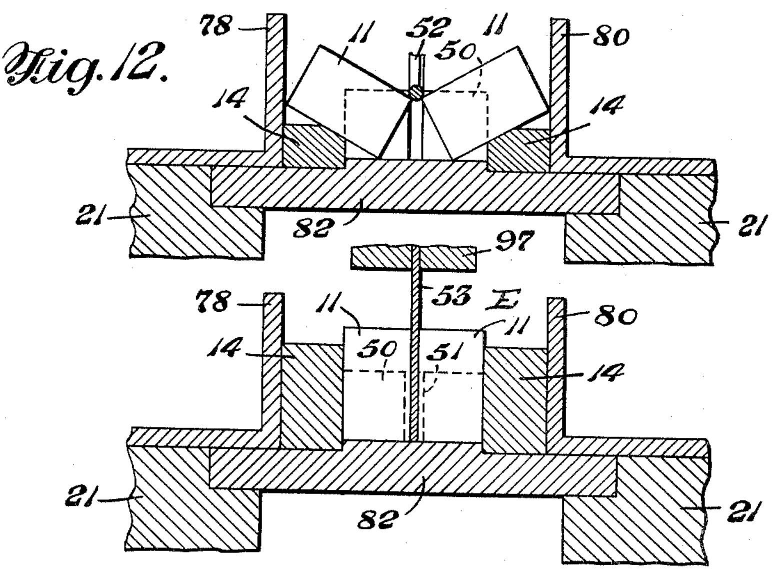
INVENTOR
ROBERT C. BROWN
BY KARL W. FLOCKS
ATTORNEY METHOD AND APPARATUS FOR ASSEMBLING SPRING CLOTHESPINS
Filed Feb. 11, 1953
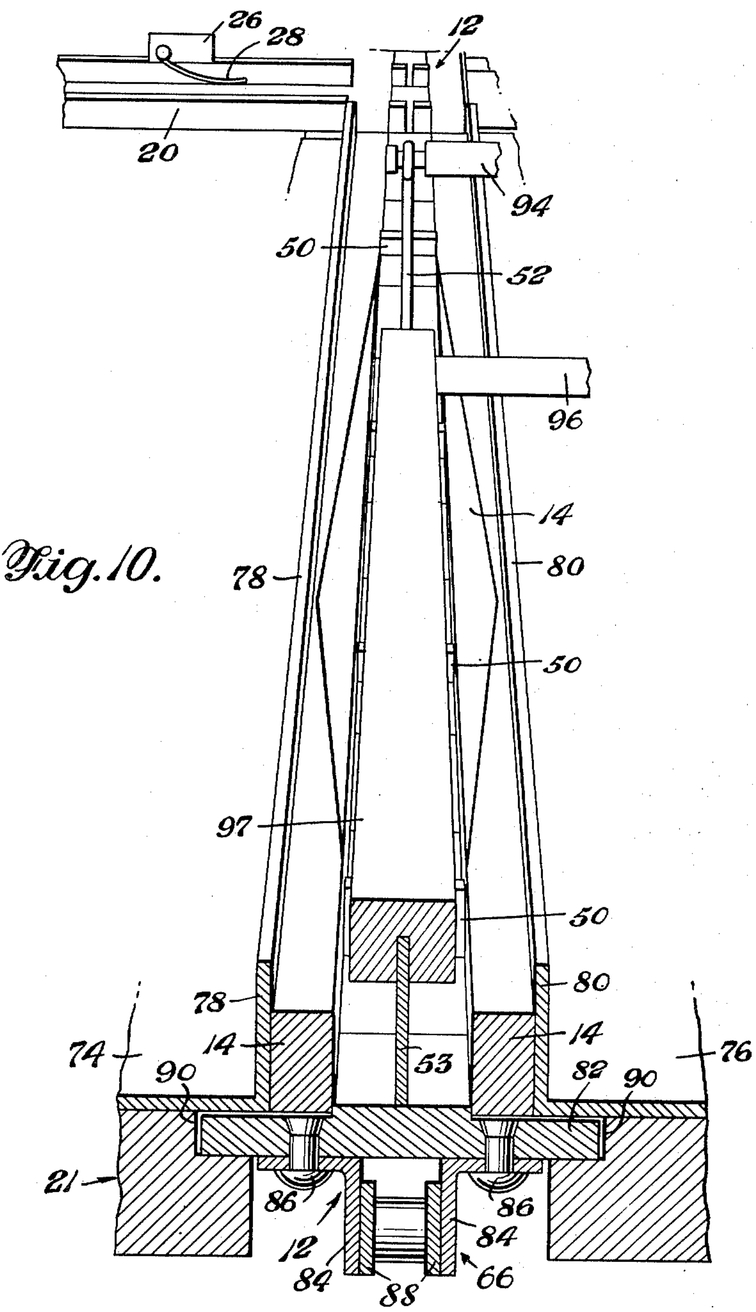
INVENTOR
ROBERT C. BROWN
BY KARL W. FLOCKS
ATTORNEY Aug. 7, 1956 R. C. BROWN 2,757,448
METHOD AND APPARATUS FOR ASSEMBLING SPRING CLOTHESPINS
Filed Feb. 11, 1953 11 Sheets-Sheet 7
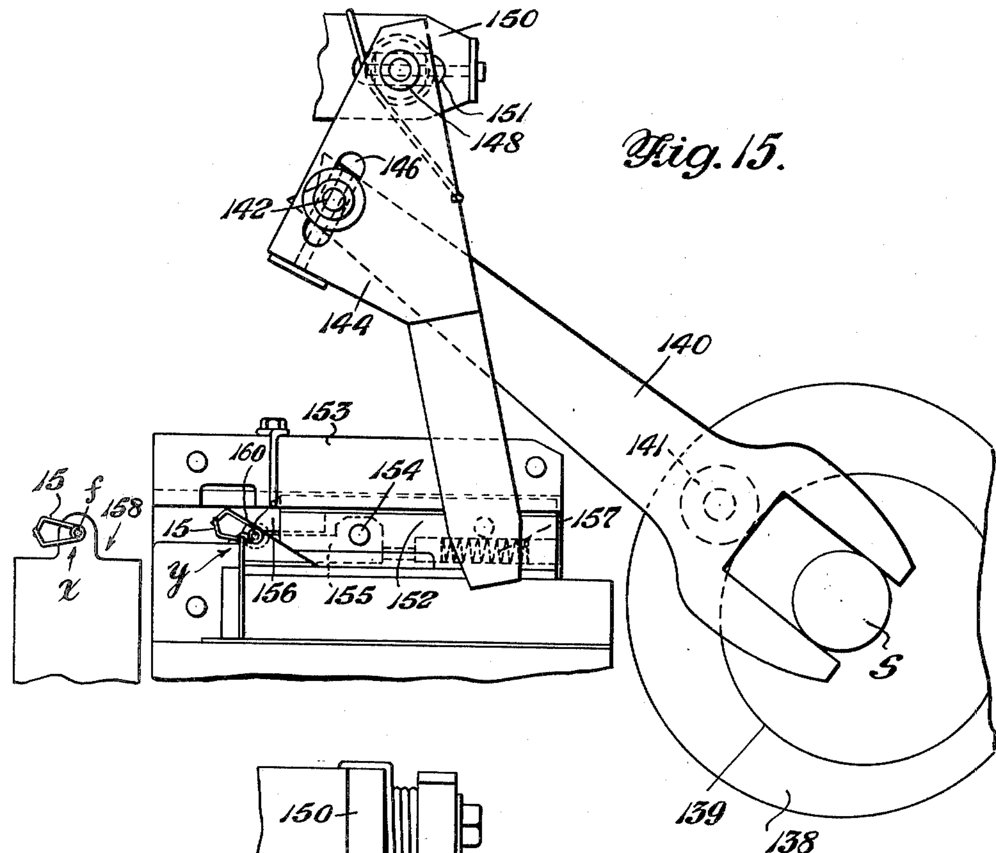
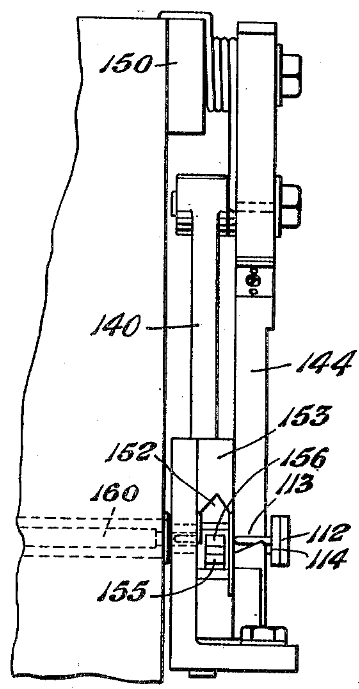
Fig. 16.
INVENTOR
ROBERT C. BROWN
BY
KARL W. FLOCKS
ATTORNEY Aug. 7, 1956 R. C. BROWN 2,757,448

METHOD AND APPARATUS FOR ASSEMBLING SPRING CLOTHESPINS

Filed Feb. 11, 1953 11 Sheets-Sheet 8

INVENTOR

ROBERT C. BROWN

BY KARL W. FLOCKS

ATTORNEY

METHOD AND APPARATUS FOR ASSEMBLING SPRING CLOTHESPINS
Filed Feb. 11, 1953. 11 Sheets-Sheet 9
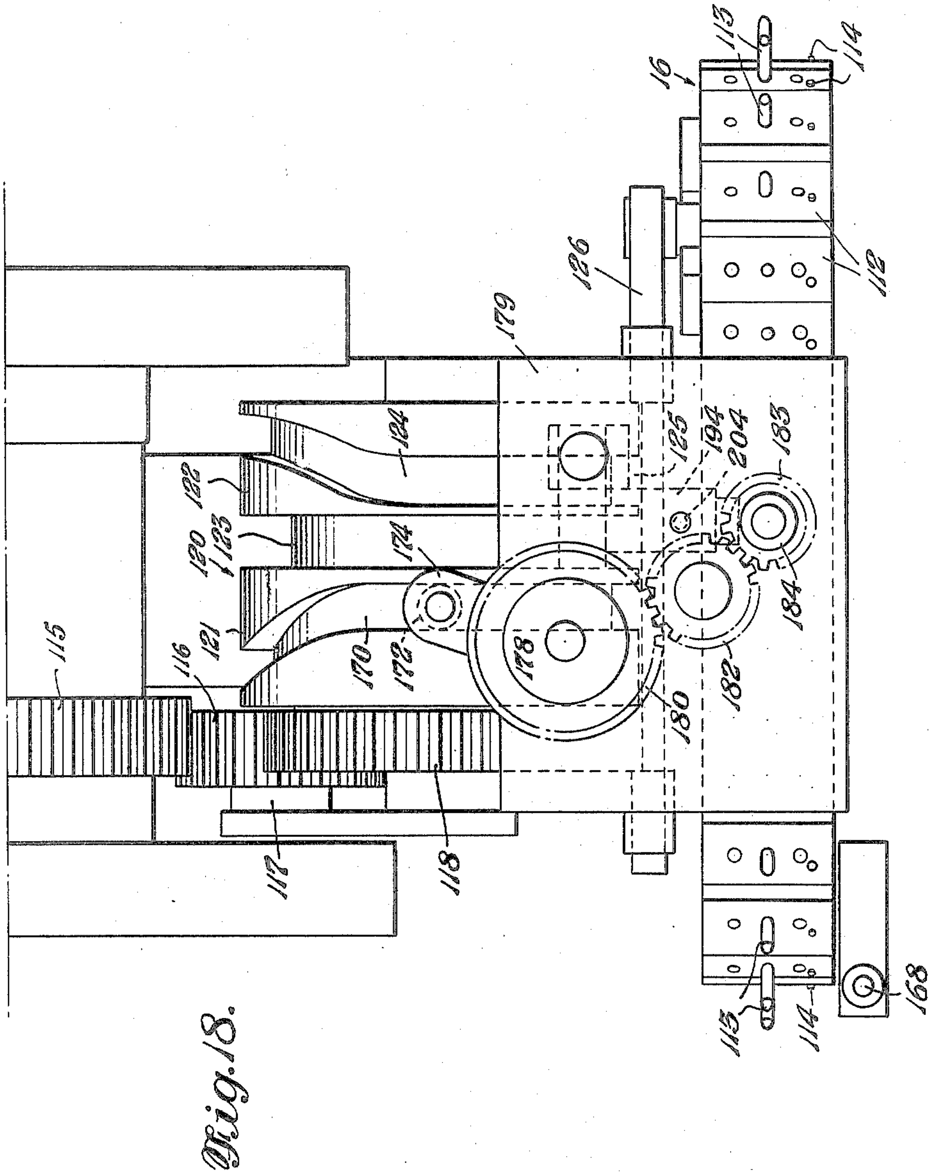
INVENTOR
ROBERT C. BROWN
BY KARL W. FLOCKS
ATTORNEY METHOD AND APPARATUS FOR ASSEMBLING SPRING CLOTHESPINS
Filed Feb. 11, 1953 11 Sheets-Sheet 10
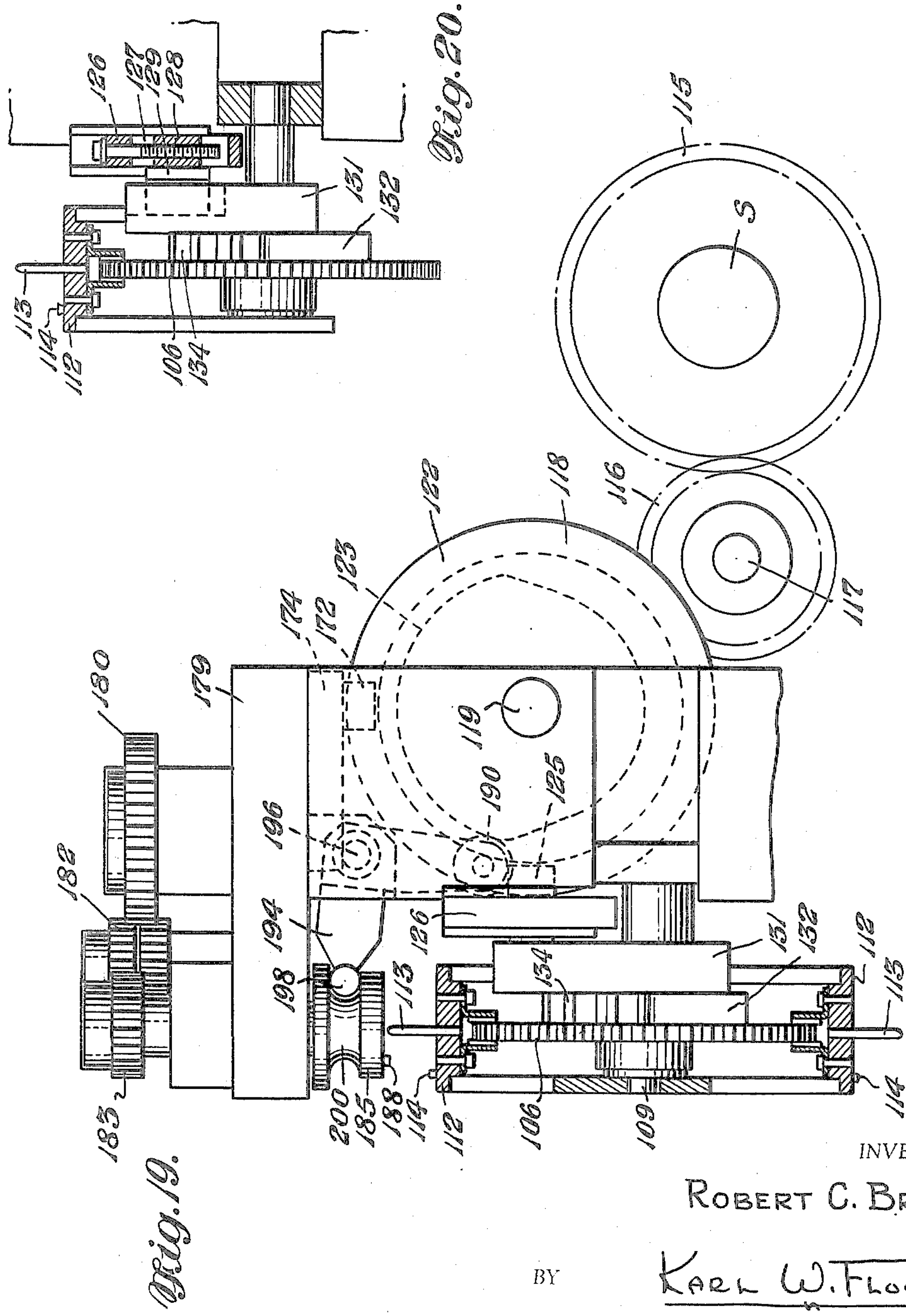
INVENTOR
ROBERT C. BROWN
BY Karl W. Flocks
ATTORNEY

METHOD AND APPARATUS FOR ASSEMBLING SPRING CLOTHESPINS

Filed Feb. 11, 1953 11 Sheets-Sheet 11

INVENTOR
ROBERT C. BROWN
BY KARL W. FLOCKS
ATTORNEY

United States Patent Office 2,757,448

Patented Aug. 7, 1956

2,757,448

METHOD AND APPARATUS FOR ASSEMBLING SPRING CLOTHESPINS

Robert C. Brown, Elmira, N. Y., assignor to The Diamond Match Company, New York, N. Y., a corporation of Delaware Application February 11, 1953, Serial No. 336,339

36 Claims. (Cl. 29—453)

The present invention relates to a clothes-pin assembly machine. More particularly, the present invention relates to a method and apparatus for automatically assembling a clothes-pin, the clothes-pin being of the type which comprises two individual clamping members and a spring member.

Prior to the instant invention, the heretofore known spring clothes-pin assembly machines have been constructed in a manner such that the assembling procedure required a manual alignment of the individual clamping members before their assembly with the spring member. This procedure was not only time-consuming due to the necessity of correctly aligning the clamping members, but moreover, the machines oftentimes required adjustment of the complicated transfer means that transferred the aligned clamping members to the spring assembly position. Moreover, the apparatus for transferring the spring member to the assembly station was not only unreliable in operation, but was not adaptable to handling large quantities of spring members.

Consequently, it is an object of the present invention to provide a clothes-pin assembly machine in which a spring member is adapted to receive individual clamping members in an efficient and expeditious manner.

Another object of the present invention is to provide a device which includes means to automatically turn the individual clamping members from their flat position to a face-to-face position in which position they are transferred to a station for receiving a spring member.

Still another object of the present invention is to provide apparatus for automatically moving the spring members to the station for assembly with the clamping members.

Still another object of the present invention is to provide apparatus for automatically opening the spring members to receive the clamping member for assembly therewith.

Other objects and the nature and advantages of the instant invention will be apparent from the following description taken in conjunction with the accompanying drawings, wherein:

Fig. 2 is a side elevational view of the apparatus illustrated in Fig. 1, with the loading guideway shown in section;

Fig. 3 is a view taken along line 3—3 of Fig. 1;

Fig. 4 is a detail plan view of the clamping member loading apparatus and partial detail plan view of the clamping member conveying apparatus;

Fig. 5 is a continuation of Fig. 4 and is a partial detail plan view of the clamping member conveying apparatus showing the stationary cams and separating blade;

Fig. 6 is a perspective view of the clamping members as they appear at station A in Fig. 4;

Fig. 7 is a perspective view of a pair of clamping members being conveyed to the stationary cams as they appear at station C in Fig. 4;

Fig. 8 is a perspective view of the clamping members being turned on the stationary cams as they appear at station D in Fig. 4;

Fig. 9 is a perspective view of the clamping members after being turned by the stationary cams as they appear at station E in Fig. 5;

Fig. 10 is a perspective view of the stationary cams for turning the clamping members, and of the conveyor and associated flights running therebetween;

Fig. 11 is a section taken along the line 11—11 of Fig. 4 with the clamping members illustrated diagrammatically and is similar to Fig. 7;

Fig. 12 is a section taken along the line 12—12 of Fig. 5 with the clamping members illustrated diagrammatically, and is similar to Fig. 8;

Fig. 13 is a section taken along the line 13—13 of Fig. 5 with the clamping members illustrated diagrammatically and is similar to Fig. 9;

Fig. 14 is a perspective view of the spring member with the leg elements spread apart to receive the clamping members;

Fig. 15 is a view taken along the line 15—15 of Fig. 1;

Fig. 16 is a side elevational view of the apparatus shown in Fig. 15;

Fig. 18 is an enlarged plan view of the spring conveyor and the apparatus for automatically opening the spring member;

Fig. 19 is a view taken along the line 19—19 of Fig. 17;

Fig. 20 is a view taken along line 20—20 of Fig. 17; and

Figure 1:
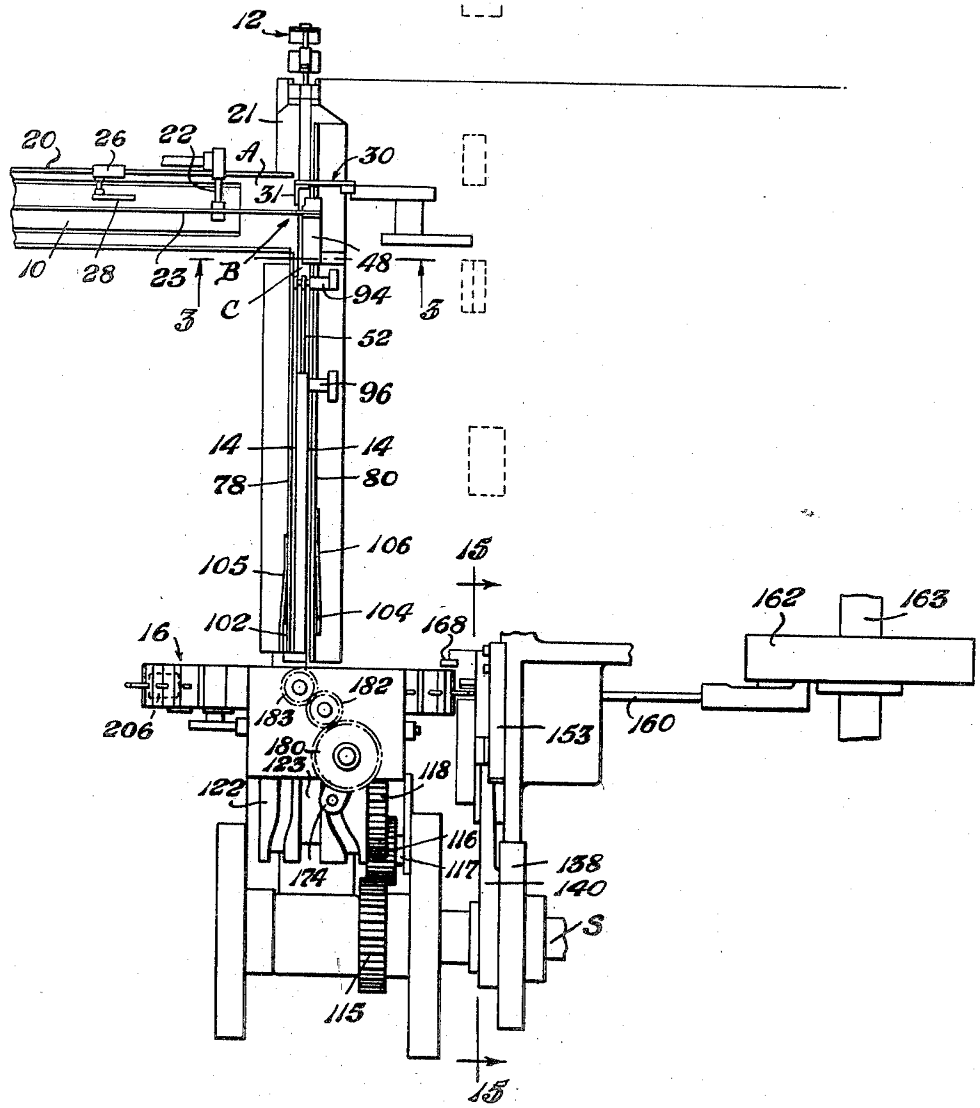
Fig. 1 is a plan view of the apparatus embodied in the present invention.

Referring to the drawings, and particularly Fig. 1, the clothespin assembly machine embodied in the present invention is shown generally comprising a continuously driven conveyor loading belt 10 which is adapted to transfer a plurality of clothes-pin halves or clamping members 11 to an intermittently driven flight belt, generally indicated at 12. The flight belt 12 conveys the clamping members 11 over cam members 14, which are arranged to suitably turn the clamping members in a manner to be described hereinafter. After the clamping members 11 are suitably turned, they are transferred to an assembly station, at which point a spring member 15 carried by an intermittently driven spring transfer belt indicated generally at 16 is moved into position and opened to receive the legs of the clamping members 11 therebetween. The assembled clothes-pin is then conveyed by the belt 16 to a suitable point of discharge.

Referring to Fig. 6, a plurality of the clamping members 11 is illustrated and comprises the clothes-pin halves to be assembled with the spring member 15, shown in Fig. 14. The clamping members 11, which are generally made of wood, are shown disposed in side-by-side and face-up relationship. The face of each clamping member 11 is formed in the usual manner with a large clamping groove *a*, a small clamping groove *b*, and a groove *c* that is adapted to receive the barrel of a spring member, the assembly of which will be described hereinafter. The notch *d* formed on the back of the clamping members 11 is adapted to receive the leg elements of the spring member 15 when the clamping members 11 are assembled therewith.

*The loading apparatus*

Referring to Figs. 1 to 4, the apparatus for loading the clamping members 11 onto the flight belt 12 is illustrated and includes a track or loading guideway 20. The loading guideway 20 is supported by a frame generally indicated at 21 and has mounted for movement thereon the loading belt 10 which is driven by suitable means and which moves in a direction perpendicular to the movement of the flight belt 12. The guideway 20 has secured thereto a support 22 which has mounted thereon a pressure bar 23. The pressure bar 23, which is positioned above the loading belt 10, extends substantially the length thereof and acts as an upper guide for the clamping members 11 as they are moved from the loading belt 10 onto a platform 24. The platform 24 is formed on the end of the loading guideway 20 adjacent the loading belt 10 and is adapted to receive the clamping members 11 for transfer to the flight belt 12. The continuous movement of the loading belt 10 transfers the clamping members 11 in side-by-side relation onto the platform 24 in a direction toward the flight belt 12, whereupon a stop member indicated generally at 30 is encountered thereby.

If the feed of the clamping members 11 by the loading belt 10 is interrupted or temporarily discontinued for any reason, the feed of the spring members 15 must be stopped or otherwise the spring members will eventually arrive at the assembly station for an incomplete assembly operation. In order to stop the operation of the assembly apparatus, which includes the loading belt 10, flight belt 12 and spring transfer belt 16, a safety switch 26 is provided. The safety switch 26 is operatively connected to the main power source and is adapted to discontinue the operation of the loading belt 10, flight belt 12 and spring member transfer belt 16. An actuator 28 is connected to the switch 26 and is adapted to actuate the switch 28 upon the indication of a discontinuance of feed of the clamping members 11. When the assembly apparatus is operating and the clamping members are being moved along the belt 10, the actuator 28 rides over the clamping members 11. If the feed of the clamping members is discontinued, the actuator will fall to the belt 10 and thereby actuator the switch 26 to cut off the main power supply.

The clothes-pin assembled by the hereindescribed apparatus necessarily includes a pair of the clamping members 11, both members of the pair being engaged by the spring member 15. It is therefore apparent that the assembly of the clothes-pin must be limited to pairs of the clamping members 11. In order to transfer a pair of the clamping members 11 onto the flight belt 12, the stop member 30 is provided. Referring to Fig. 3, the stop member 30 is shown including a downwardly depending portion 31 which is positioned directly adjacent the loading platform 24 and, thereby, controls the forward movement of the clamping members 11 onto the flight belt 12. The downwardly depending portion 31 is secured to a horizontally extending bar 32 which is adapted to be moved vertically. Vertical movement of the bar 32 is effected by a vertically extending rod 34 which engages a slotted portion 37 secured to the end section of the bar 32. The rod 34 extends through a hollow block 38 attached to the frame 21 and has engaged therewith on either side of the block 38, nuts 39 and 40. Mounted around the rod 34 and secured to the nut 39 and the lower end of the block 38 is a spring 41 which is adapted to positively return the rod 34 and the bar 32 operatively connected thereto to the stop position after each pair of clamping members has been admitted to the flight belt 12. The rod 34 is moved by a lever 42 which is pivotally connected thereto at 43. The lever 42 is actuated by a cam arrangement (not shown) which is operatively connected to the intermittently driven flight belt 12, the drive of which will be described hereinafter. The cam arrangement thereby actuates the stop member 30 in timed relation with the movement of the intermittently driven flight belt 12 to admit pairs of the clamping members 11 from the loading platform 24 onto the flight belt 12. Referring again to Fig. 3, a limit plate 44 is shown mounted on the frame 21 and extending over a portion of the flight belt 12 directly opposite the point of admission of the clamping members onto the flight belt 12. The limit plate 44 and the stop member lower extending portion 31 define therebetween a space into which only two of the lamping members 11 can be moved. Consequently, when the bar 32 moves upwardly in response to the rod 34 to admit the clamping members onto the belt 12, the plate 44 prevents more than two of the clamping members 11 from being admitted thereon. Downward movement of the portion 31 then prevents further movement of the clamping members toward the belt 12. Movement of the belt 12 carries the newly admitted pair of clamping members 11 toward the assembly station and the portion 31 is again moved upwardly in timed relation with the belt 12 to admit another pair of the clamping members thereon. In order to insure the correct position and alignment of the clamping members 11 on the flight belt 12, as they are trasferred thereto from the loading platform 24, a pressure foot 48 secured to the pressure bar 23 is provided and is located directly over the flight belt 12 (Fig. 4). Sufficient clearance is provided between the flight belt 12 and the pressure foot 48 for the clamping members 11 to be admitted therebteween and the clamping members are thereby correctly aligned in side-by-side relation as they are transferred onto the flight belt 12.

*The transfer apparatus*

The transfer apparatus is adapted to transfer the clamping members 11 to a station for assembly with the spring members 15 and includes the intermittently driven flight belt 12 mounted for movement on the frame 21. Referring to Fig. 7, the flight belt 12 is shown with a pair of clamping members 11 seated thereon and has secured thereto upwardly projecting flight members 50 which are adapted to contact the head end of the clamping members 11 as they are moved onto the flight belt 12. The flight members 50 have slots 51 formed therein which provide for the movement of the flight members past a rod 52 and a blade 53 mounted between the cam members 14 (Fig. 5), the purpose of which will hereinafter be described.

Referring to Fig. 2, the drive for the intermittently driven flight belt 12 is shown comprising a driving arm 54 which is operatively connected to a main drive shaft S (Fig. 1). The driving arm 54 pivotally engages a lever 55 at 56, the lever 55 being loosely mounted on a shaft 57 which is journalled in the frame 21. A ratchet 58 is mounted on the shaft 57 and is secured for rotation therewith with a gear 60. Attached to the lever 55 is a pawl 62 which is adapted to operatively engage the ratchet 58. The gear 60 meshes with a gear 63 which is mounted for rotation on the frame 21 with a sprocket gear 64. The sprocket gear 64 engages and drives a sprocket chain 66 which is formed as an integral part of the flight belt 12.

In operation, the main drive shaft S reciprocates the driving arm 54, thereby oscillating the lever 55. As the lever oscillates, the pawl 62 connected thereto engages the ratchet 58, causing intermittent rotation thereof. Rotation of the ratchet 58 causes rotation of the gear 60 which, in turn, drives gear 63. The gear 63 then drives the sprocket gear 64 mounted for rotation therewith. It is apparent that as the sprocket gear 64 is intermittently rotated due to the reciprocating motion of the driving arm 54, the sprocket chain 66 will also be moved intermittently. Idler sprockets 68, 70, 72 are conveniently mounted on the frame 21 and provide the necessary support for the sprocket chain 66.

Referring now to Fig. 10, the general construction and arrangement of the cam members 14 and flight belt 12 with respect to the loading guideway 20, are illustrated. A pair of elongated sections 74, 76 are supported by the frame 21 and have integrally formed therewith upstanding portions 78 and 80. The upstanding portions 78, 80 have secured to their inside faces cam members 14 which define therebetween an open channel in which the flight members 50 carried by the belt 12 are adapted to move. The belt 12, which is operated directly below the cam members 14 and sections 74, 76 is constructed in a series of plates 82. The plates 82, which form the surface of the flight belt 12 are secured to L-shaped link members 84 by rivets 86, see Fig. 11. The link members 84 are, in turn, secured to inner links 88, which are formed as part of the sprocket chain 66. The chain of plates 82, which forms the conveying means for the belt 12, rides in a cutout portion 90 formed in the frame 21. As illustrated in Figs. 7 and 10, the flight members 50 are secured directly to the plates 82 but are only as wide as the open channel defined by the cam members 14.

Referring to Figs. 5, 6, 7 and 8, the cam members 14 are shown formed with contoured surfaces such that the upwardly facing clamping members 11 will be caused to turn to a face-to-face position as they are moved along the length of the cams by the flight belt 12 and associated flight members 50. It is apparent that as the clamping members 11 leave the loading guideway 20 (station A) and are received by the flight belt 12 (station B), a flight member 50 will contact the members 11 and carry them down the open channel and over the gradually turning surfaces of the cam members 14. As the members 11 move over the surfaces of the cam members 14, they are turned from a face-up position (station C), shown in Figs. 7 and 11, to an intermediate position (station D), Figs. 8 and 12, and then to a face-to-face position (station E), shown in Figs. 9 and 13, in which position they are ready for the spring assembly operation.

In order to assure the correct turning movement of the clamping members 11 as they are moved over the surfaces of the cam members 14, the rod 52 and blade 53 are provided. The rod 52 extends approximately one-third the length of the cam members 14, being positioned therebetween, and pivotally supported at the upstream end of the cam members 14 by a support 94 mounted on the elongated section 76. As shown in Figs. 2 and 8, the rod 52 slopes downwardly from the upstream end of the cam members 14, the lower end of the rod 52 resting on the flight belt 12. The blade 53 is pivotally secured to a support 96 mounted on the elongated section 76 and extends in an inclined position from the lower end of the rod 52 to the downstream end of the cam members 14. As shown in Figs. 5 and 9, the blade 53 is positioned midway between the cam members 14 and rests on the flight belt 12 at the downstream end thereof.

Referring to Figs. 2 and 5, an elongated bar 97 is shown pivotally mounted on the support 96 at the outer end thereof. The elongated bar 97 carries the blade 53 and provides the necessary weight for holding the blade 53 in position between the cam members 14 as the clamping members 11 are moved over the cam surfaces. It is apparent that as the flight belt 12 moves the clamping members 11 over the surfaces of the cam members 14, the rod 52 will be initially forced between the clamping members 11 and thereby force each clamping member to follow the surface of the cams (Fig. 8). Further movement of the clamping members 11 over the cam surface moves the blade 53 between the clamping members 11, thereby aiding in turning the clamping members on the cam surfaces and properly centering them for the assembly operation. The passage of the upstanding flight members 50 past the rod 52 and blade 53 as the belt 12 moves the clamping members 11 over the cam surfaces is provided by forming the slots 51 in the flight members as described hereinabove. As the face-to-face clamping members 11 leave station E, Figs. 9, 13, with the blade 53 spaced therebetween, they are carried by the flight belt 12 to station F, at which point they are contacted by a pair of oppositely disposed pressure plates 102 and 104. The pressure plates 102, 104 are secured to leaf springs 105, 106, respectively, which are, in turn, attached to the upstanding portions 78, 80. The pressure plates 102, 104 extend through the corresponding upstanding portion and cam member and contact the clamping members 11 as they move toward an assembly staiton G. As seen in Fig. 5, the pressure plates 102, 104 are adapted to hold the clamping members 11 firmly against the blade 53 as the clamping members are moved toward the assembly station G and thereby positively center the clamping members 11 in the correctly aligned position for assembly with the spring members 15.

*The spring transfer and assembly apparatus*

Referring to Figs. 15 through 20, the spring transfer and assembly apparatus is illustrated and includes the intermittently driven spring transfer belt 16. The belt 16 is adapted to receive the spring members 15 and transfer them to the assembly station G, at which point the clamping members 11 are assembled therewith. A spring member 15 is shown in Fig. 14 and comprises a barrel portion *f* and leg portions *g* and *h*. When the clothespin is completely assembled, the barrel portion *f* of the spring is engaged between the grooves *c* of the clamping members 11, while the leg portions *g* and *h* engage the notches *d* formed in the back of the clamping members 11.

Figure 17:
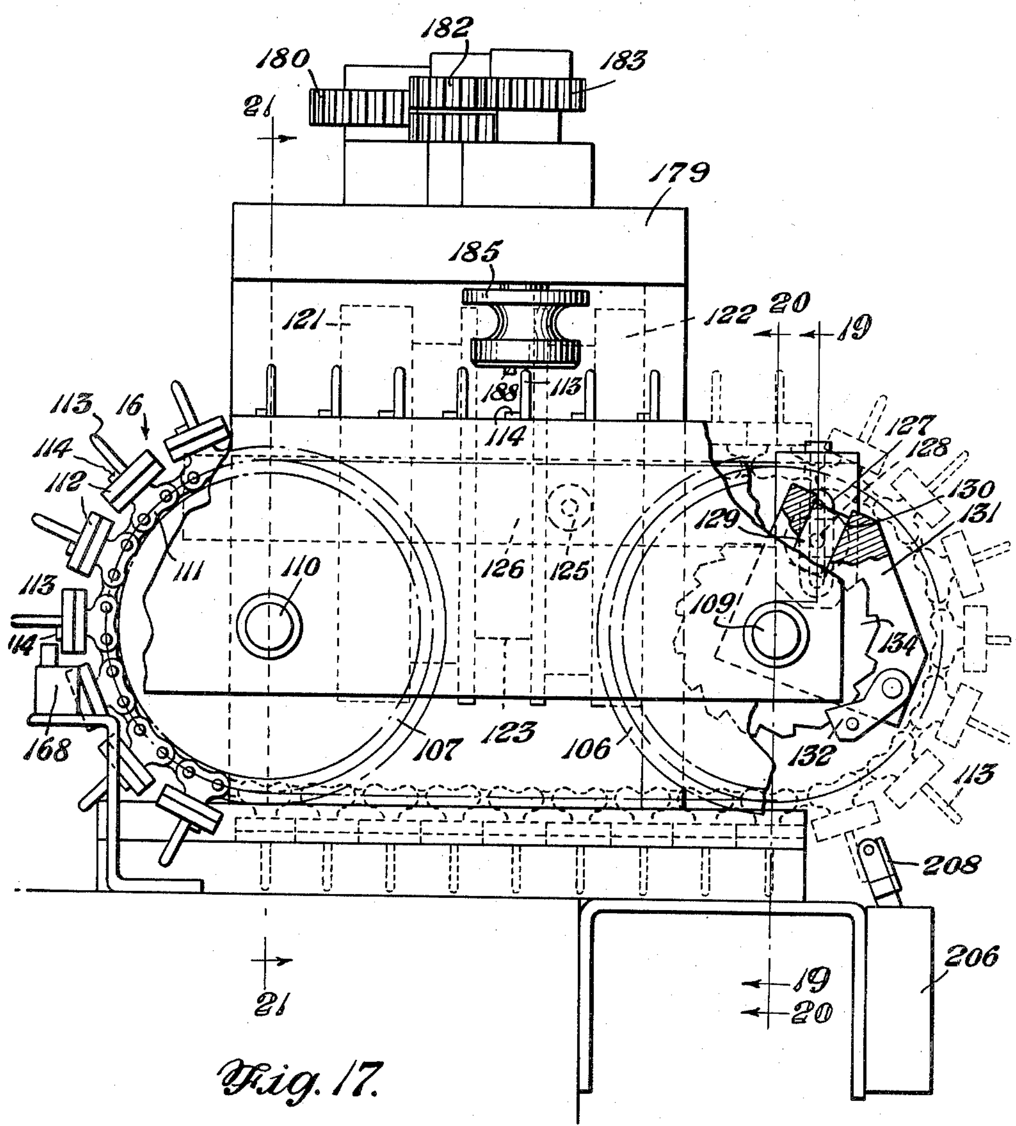
Fig. 17 is an enlarged rear elevational view of the spring member conveyor and the apparatus for automatically opening the spring member.

Referring particularly to Figs. 17 and 19, the intermittently driven spring transfer belt 16 is shown engaging sprocket gears 106, 107 mounted for rotation on the shafts 109, 110, respectively, which are journalled in a suitable frame. The belt 16 includes a plurality of links 111 which are connected together to form a chain and each of which has secured thereteo a plate 112. Formed integral with the plates 112 are elongated pins 113 and short pins 114, the purpose of which will hereinafter be described.

Referring now to Figs. 18, 19 and 20, the drive for the intermittently driven spring transfer belt 16 is illustrated and includes the main drive shaft S which is rotated by the main power source (not shown). Secured for rotation on the drive shaft S is a gear 115 which engages an intermediate gear 116 mounted on a shaft 117. The intermediate gear 116 engages an operating gear 118 which is mounted on a shaft 119 suitably journalled for rotation in a frame. Mounted on the shaft 119 adjacent the gear 118 is a cam unit indicated generally at 120 (Fig. 18). The cam unit 120 includes slotted cams 121 and 122 and an eccentric cam 123 positioned between the slotted cams 121, 122. The cam 122, which is adapted to advance the belt 16 in an intermittent motion, has a slot 124 formed therein which receives a follower 125 therein (Fig. 17). The follower 125 is secured to a transfer bar 126 which reciprocates in response to the movement of the follower 125 in the cam slot 124. Formed in the transfer bar on the end adjacent sprocket gear 106 is a vertically extending slot 127 which receives a pin 128 therein. The pin 128 is secured to a block 129 which is disposed in a slot 130 formed in a forked plate 131. The plate 131 is mounted for pivotal movement on the shaft 109 and has secured thereto a pawl 132. The pawl 132 is adapted to engage a ratchet wheel 134 which is secured to the sprocket gear 106 and rotates therewith on the shaft 109. In operation, the gear 115 rotates the gear 116 which, in turn, rotates the operating gear 118. Rotation of the gear 118 causes the cam 122 to rotate, which reciprocates the transfer bar 126 moving in response to the movement of the follower 125. As the transfer bar reciprocates, the block 129 (Fig. 17) is moved but is forced to follow the movement of the pin 28 moving vertically in the slot 127. Consequently, the forked plate 131, in which the block 129 is disposed, is forced to rotate around the shaft 109. Rotation of the plate 131 moves the pawl 132 secured thereto into engagement with the ratchet wheel 134, causing intermittent rotation thereof on the shaft 109. As the ratchet wheel 134 intermittently rotates on the shaft 109, the sprocket gear 106 secured for rotation with the ratchet wheel rotates, thereby causing intermittent movement of the belt 16.

Referring to Figs. 1, 15 and 16, the spring member transfer apparatus is illustrated and includes a cam 138 which is secured to the main drive shaft S for rotation therewith. The cam 138 has formed integral therewith an eccentric surface 139 which receives thereon a follower 141. The follower 141 is secured to an elongated arm 140 which is forked at one end. The forked end of the arm 140 surrounds the shaft S, thereby enabling the arm 140 to reciprocate thereon. It is apparent that as the cam 138 rotates, the follower 141 riding on the surface 139 will cause the arm 140 to reciprocate. Pivotally secured to the arm 140 at pivot point 142 is a lever 144 which is shown with an enlarged portion having an adjustment slot 146 formed therein. The enlarged portion of the lever 144 is pivotally secured at 148 to a stationary frame 150 which has a slot 151 formed therein, which provides for adjustment of the pivot point 148. The lever 144 is secured at its lower end to a slide plate 152 which is disposed in a housing 153. Also located in the housing 153 and pivotally engaging the slide plate 152 at 154 is a movable jaw 155 which cooperates with a stationary jaw 156. A spring 157 operatively engages the slide plate 152 and is adapted to retain the movable jaw 155 in engagement with the stationary jaw 156. A spring forming device indicated generally at 158 forms the spring members 15 from wire and moves them to the position X shown in Fig. 15. With the spring members 15 located in the position X, the arm 144 moves the slide plate 152 to the left, as seen in Fig. 15. As the jaws 155, 156 move to the left, they engage the barrel portion *f* of the spring member 15, the movable jaw 155 moving downwardly and snapping around the barrel portion *f*. At this point, the lever 144 operates to move the slide plate 152 to the right, thereby moving therewith the jaws 155, 156 which retain the spring member 15 therebetween. The slide plate 152 then returns to its original position, in which position the spring member 15 is located at Y and is ready to be transferred onto the belt 16. Referring to Fig. 1, a spring transfer arm 160 is shown mounted adjacent the housing 153 and is operatively connected to a cam 162, which is driven by a drive shaft 163 connected to the main source of power. As the cam 162 is rotated by the drive shaft 163, the spring transfer arm 160 is moved in response thereto toward the left, as seen in Fig. 1. Referring to Fig. 16, a plate 112 of the belt 16 with the pin 113 formed thereon, is shown positioned adjacent the jaws 155, 156 and is ready to receive a spring member therefrom. In operation, the jaws 155, 156 are moved to position X to engage a spring member 15 and are then moved back to position Y. The arm 160 is then actuated to push the spring member 15 from between the jaws 155, 156 onto the belt 16 where the spring member is received and retained by the pin 113. As each spring member 15 is pushed into engagement with the belt 16, the leg *g* abuts against the small pin 114, which is adapted to firmly hold the leg *g* against movement when the spring member 15 is assembled with the clamping members 11 at the assembly station G. Referring the Figs. 17 and 18, a magnet 168 is shown mounted adjacent the belt 16 and is provided to snap the leg *g* of the spring members 15 into position against the small pin 114 as the spring members 15 are transferred onto the belt 16 and into engagement with the elongated pin 113.

Figure 21:
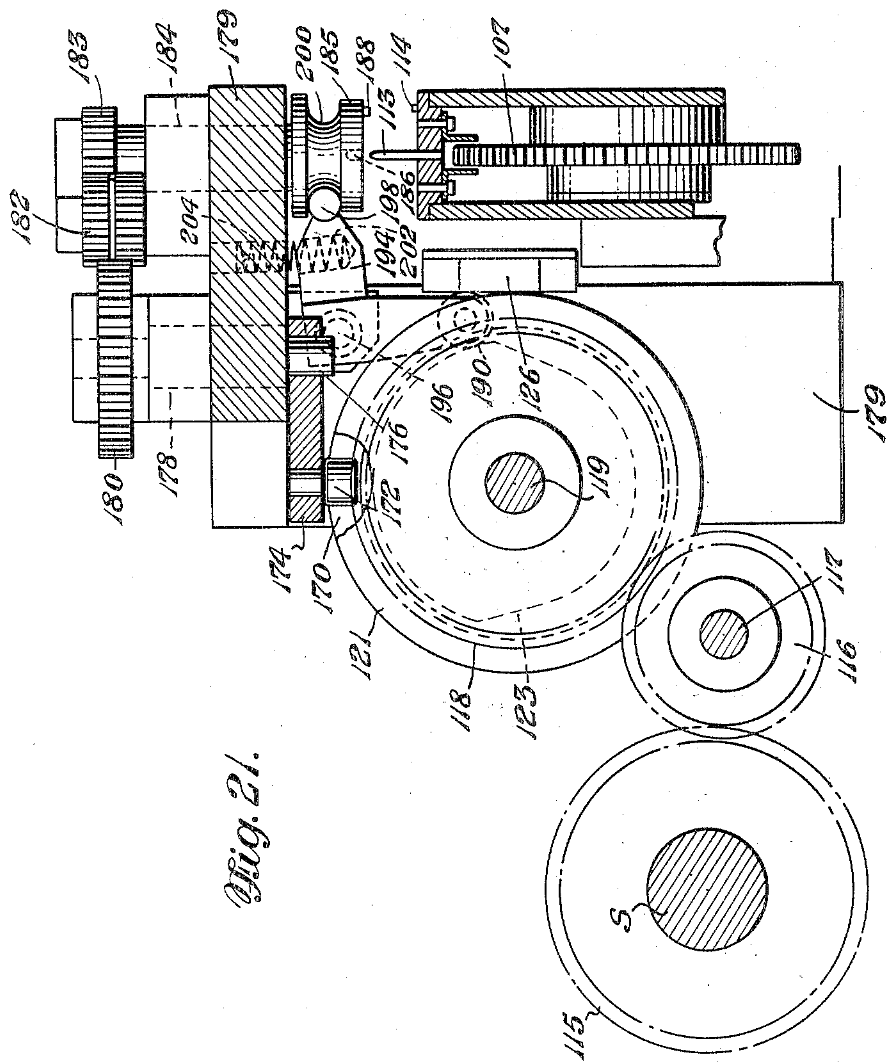
Fig. 21 is a view taken along line 21—21 of Fig. 17.

After each spring member 15 is transferred to the belt 16 and is moved thereby to the spring assembly station G for assembly with the clamping members 11, it is necessary to move apart the legs *g*, *h* of the spring member 15 so that the clamping members 11 may receive the spring member barrel *f* therebetween. Referring to Figs. 18, 19 and 21, the spring member opening apparatus is illustrated and includes the cam 121 which is formed as an integral part of the cam unit 120. The cam 121 is secured for rotation with the gear 118 and has a slot 170 formed therein which receives a follower 172 for movement therein. Referring particularly to Fig. 21, the follower 172 is shown secured to a plate or lever 174 which engages a stub shaft 176. The stub shaft 176 is integrally formed on the lower end of a shaft 178 which is journalled for rotation in a frame 179. Secured to the upper end of the shaft 178 for rotation therewith is a gear 180 which engages an idler gear 182. The idler gear is secured for rotation to a shaft mounted in the frame 179 and, in turn, engages a gear 183 secured for rotation with a shaft 184 journalled in the frame 179. The shaft 184 and gear 183 are adapted to be vertically moved in the frame 179, the operation of which will hereinafter be described. The shaft 184 has formed on the lower end thereof an actuating head 185 which has formed on the underside thereof a vertically extending slot 186. The slot 186 receives the pins 113 therein as the belt 16 is intermittently moved and thereby permits a projecting pin 188 to engage the leg *g* of the spring member 15. The projecting pin 188 which is formed on the underside of the actuating head 185 is adapted to force the leg *g* of the spring member 15 away from the leg *h*, thereby enabling the handle ends of the clamping members to be moved therebetween during the spring assembly operation. It is apparent that upon rotation of the shaft S, the cam 121 rotates, which causes the follower 172 to move in the slot 174. The gear 180 rotates in response to the movement of the lever 174 secured to the follower 172 and rotates gears 182 and 183. Rotation of the gear 183 causes rotation of the actuating head 185, which, during the assembly operation, moves the pin 188 into engagement with the leg *g* of the spring member 15 which is carried by the belt 16. In this position, the leg *h* of the spring member 15 is firmly held against movement by the pin 114. Further rotation of the actuating head 185 moves the leg *g* of the spring member 15 away from leg *h* to the position for receiving the clamping members 11.

In order to move the gear 183 and the actuating head 185 vertically, thereby alternately moving the pin 188 away from and into engagement with the leg *g* of each of the spring members 15, the cam 123 secured for rotation with the cam unit 120 is provided. The cam 123 is formed eccentrically with respect to the shaft 119 upon which the cam unit 120 is mounted and is engaged by a follower 190. The follower 190 is forced into engagement with cam 123 by a bell crank lever 194 pivotally mounted on the frame 179 at pivot point 196. The bell crank lever 194 has a ball portion 198 formed on the end thereof which engages a recessed portion 200 formed in the actuating head 185. Formed in the bell crank lever 194 is a hole 202 which receives a spring 204 which is also disposed in a vertical bore formed in the frame 179. The spring 204 acts to force the bell crank lever 194 downwardly and thereby acts to move the follower 190 into engagement with the cam 123. As the bell crank lever 194 pivots in response to the follower 190 riding on the cam 123, the actuating head 185 will be moved vertically and at properly timed intervals will move downwardly into contact with a spring member 15 carried by the belt 16. It is apparent that as the cam 123 rotates, the follower 190 moves on the eccentric surface thereof, thereby pivoting the bell crank lever 194 at predetermined intervals and against the action of the spring 204. Movement of the bell crank lever 194 then moves the actuating head 185 vertically into or out of engagement with a spring member 15. Due to the intermittent movement of the belt 16 by the transfer bar 126, a sufficient amount of time is provided for the actuating head 185 to be rotated after the downward movement thereof which moves the leg *g* of the spring member 15 away from the leg *h*, thereby positioning the spring member 15 for assembly with the clamping members 11. Further movement of the belt 16 is timed with the movement of the cam 123, which operates to move the actuating head 185 upwardly and out of engagement with the assembled clothes-pin.

Continued movement of the belt 16 carries the assembled clothes-pin thereon until a point is reached whereby, due to the downwardly facing direction of the pin 113, the clothes-pin will drop from engagement therewith. Referring to Fig. 17, it is apparent that the assembled clothes-pins will drop from engagement with the belt 16 when the plates 112 reach the position below the center line of the belt. In the event that an assembled clothes-pin does not drop from the belt 16, a cut-off switch 206 is provided and includes an actuating arm 208. If the assembled clothes-pin remains on the pin 113, it will strike the actuating arm 208, which trips the switch 206 to cut off the power to the assembly apparatus, including the loading belt 10, flight belt 12 and spring member transfer belt 16, thereby stopping the operation thereof.

*Operation*

The clamping members 11 to be assembled are placed on the loading belt 10 in a face-up, side-by-side position and are moved to station A where they are forced against the stop member 30. At properly spaced intervals and in timed relation with the movement of the belt 12, the stop member 30 is actuated to admit a pair of clamping members onto the belt 12 at station B (Fig. 4). Immediately after the clamping members 11 reach station B, they are contacted by an upwardly projecting flight member 50 secured to the flight belt 12 and are transferred thereby to station C. At station C (Figs. 7 and 11), the upwardly facing side-by-side clamping members encounter the rod 52 which forces them firmly against the surfaces of the cams 14. From station C, the clamping members are moved over the gradually turning surfaces of the cam 14 to station D (Figs. 8 and 11) at which point the rod 52 extends into blade 53 which also serves to firmly hold the clamping members 11 against the cam surfaces. When the clamping members reach station E (Figs. 9 and 13), they have completed the turning movement and are disposed in face-to-face position. Further movement of the flight belt 12 moves the clamping members 11 forward to station F and into contact with the pressure plates 102, 104 which act to force the clamping members 11 firmly against the blade 53, thereby centering them for the assembly operation at station G. In the meantime, the spring members 15 are formed by convenient wire forming means and then transferred to the intermittently driven spring member transfer belt 16 by the spring transfer arm 160. As each spring member 15 is transferred onto the belt 16 to the assembly station G, the actuating head 185 is brought into engagement therewith, the pin 188 contacting the spring member leg *g*. The actuating head 185 is then rotated to move the leg *g* away from the leg *h* which enables the handle ends of the advancing clamping members to move therebetween. Continued movement of the flight belt 12 pushes the clamping members 11 into firm engagement with the spring member 15 at the assembly station G, the barrel *f* fitting into the groove *c* formed in the face of the clamping members 11. The assembly is complete when the legs *g*, *h* snap into the notches *d* provided on the back of each clamping member. The belt 16 then transfers the assembled clothes-pin to a suitable discharge point, where the clothes-pin automatically drops from engagement with the belt.

It will be obvious to those skilled in the art that various changes may be made without departing from the spirit of the invention and, therefore, the invention is not limited to what is shown in the drawings and described in the specification, but only as indicated in the appended claims.

What is claimed is:

1. Apparatus for assembling spring clothes-pins, comprising loading means for conveying clamping members to a loading station, transfer means adjacent said loading station for receiving said clamping members thereon, means for intermittently driving said transfer means, means responsive to the movement of said transfer means for controlling the admission of said clamping members onto said transfer means, stationary cam means positioned parallel to said conveying means having gradually turned surfaces for turning said clamping members from a face-up position to a face-to-face position as said clamping members are transferred thereover, intermittently driven means for conveying a spring member to an assembly station for assembly with said clamping members, means for intermittently driving said intermittently driven means, means for transferring said spring member from a stationary position onto said intermittently driven means, and means for moving the legs of said spring member to an open position, thereby enabling said spring member to receive said clamping members for assembly therewith.

2. Apparatus for assembling clothes-pins, comprising loading means, said loading means being adapted to convey a plurality of face-up clamping members to a loading station, transfer means adjacent said loading station receiving said clamping members therefrom, stop means adjacent said loading station and transfer means responsive to the movement of said transfer means for controlling the admission of said clamping members onto said transfer means, and switch means responsive to the movement of said clamping members on said loading means for controlling the operation of said loading means and said transfer means.

3. Apparatus for assembling clothes-pins as set forth in claim 2, wherein limit means is provided adjacent said stop means, said limit means cooperating with said stop means to permit pairs of clamping members to be admitted onto said transfer means.

4. Apparatus for assembling clothes-pins as set forth in claim 2, wherein cam means are disposed above said transfer means and are adapted to turn said face-up clamping members to a face-to-face position as they are moved thereover by said transfer means.

5. Apparatus for assembling clothes-pins, comprising loading means, transfer means adjacent said loading means, said transfer means receiving pairs of face-up clamping members from said loading means for transfer thereon, drive means operatively connected to said transfer means for driving said transfer means with an intermittent movement, and stop means adjacent said loading means responsive to the movement of said transfer means for controlling the admission of said clamping members onto said transfer means.

6. Apparatus for assembling clothes-pins as set forth in claim 5, wherein cam means are disposed above said transfer means and are adapted to turn said face-up clamping members to a face-to-face position as they are moved thereover by said transfer means.

7. Apparatus for assembling spring clothes-pins, comprising a loading means, said loading means including a conveyor belt, transfer means disposed at right angles to said conveyor belt receiving pairs of clamping members in face-up relation therefrom, cam means disposed above said transfer means formed with gradually turned surfaces for turning the clamping members from their face-up position to a face-to-face position, and a spring member conveying means disposed at right angles to said transfer means conveying spring members to an assembly station for assembly with said clamping members.

8. Apparatus for assembling spring clothes-pins, comprising a loading means, transfer means disposed at right angles to said loading means and adapted to receive therefrom pairs of clamping members arranged in face-up relation, cam means located above said transfer means having gradually turned surfaces, said transfer means adapted to move said clamping members over said surfaces thereby turning the clamping members from their face-up position to a face-to-face position, and conveying means disposed at right angles to said transfer means, said conveying means conveying spring members to an assembly station for assembly with said clamping members.

9. Apparatus for assembling clothes-pins, comprising means for transferring pairs of clamping members thereon, and cam means disposed above said transfer means, said cam means having gradually turned surfaces for turning said clamping members from a face-to-face position to a face-up position.

10. Apparatus for assembling clothes-pins, comprising a pair of oppositely disposed cams, said cams being formed with gradually turning faces, said gradually turning faces being adapted to turn a pair of face-up clamping members to a face-to-face position.

11. In a method of assembling spring clothes-pins, conveying a plurality of clamping members in face-up side-by-side relation to a first station, transferring pairs of said clamping members to a second station, moving said clamping members from their face-up position to a face-to-face position, transferring said face-to-face clamping members to an assembly station, conveying a spring member to said assembly station, opening the legs of said member to receive the handle ends of said clamping members, moving said clamping members into engagement with said spring member, and conveying the assembled clothes-pin to a removal station.

12. In a method of assembling spring clothes-pins, conveying a plurality of clamping members in face-up side-by-side relation to a first station, transferring pairs of said clamping members to a second station, conveying said clamping members to a third station whereby said clamping members are turned from their face-up position to a face-to-face position, conveying said face-to-face clamping members to an assembly station, conveying a spring member to said assembly station, moving said clamping members into engagement with said spring member for assembly therewith, and conveying the assembled clothespin to a removal station.

13. In a method of assembling spring clothes-pins, transferring a plurality of clamping members to a conveying means, conveying said clamping members to an assembly station whereby said clamping members are moved from a face-up position to a face-to-face position, conveying a spring member to said assembly station, moving the legs of said spring member to a position to receive said clamping members, forcing said clamping members into engagement with said spring member, and conveying the assembled clothes-pin to a removal station.

14. A method of assembling spring clothes-pins, comprising conveying a plurality of clamping members in face-up side-by-side relation to a loading station, moving pairs of said clamping members to a transfer means, turning said clamping members gradually from their face-up position to a face-to-face position, conveying a spring member to an assembly station by a conveying means, moving the handle ends of said clamping members between the extended ends of said spring member at the assembly station while the spring member remains on said spring conveying means, and conveying the completed clothes-pin from the assembly station to a removal station.

15. A method of assembling spring clothes-pins, comprising conveying a plurality of clamping members in face-up side-by-side relation to a loading station, transferring pairs of said clamping members from said loading station to a transfer station, turning said clamping members from their face-up position to a face-to-face position, transferring the face-to-face clamping members to an assembly station, conveying a spring member to the assembly station, moving the handle ends of said clamping members between the ends of said spring member, thereby assembling the clothes-pin, and conveying the assembled clothes-pin to a station for removal thereof.

16. A method of assembling spring clothes-pins, comprising conveying pairs of clamping members in face-up position to a transfer station, transferring said clamping members over a cam, thereby moving said clamping members to a face-to-face position, transferring the face-to-face clamping members to an assembly station, conveying a spring member to said assembly station, assembling the spring member with said clamping members, and conveying the assembled clothes-pin to a removal station.

17. A method of assembling clothes-pins, comprising transferring a pair of clamping members over a cam thereby moving the clamping members from a face-up position to a face-to-face position and assembling said face-to-face clamping members with a spring member.

18. Apparatus for assembling clothes-pins, comprising loading means, transfer means disposed at right angles to said loading means and adapted to receive therefrom pairs of clamping members arranged in face-up relation, cam means disposed above said transfer means having gradually turned surfaces, said transfer means adapted to move said clamping members over the cam surfaces thereby turning said clamping members from their face-up position to a face-to-face position, and means conveying spring means for assembly with said clamping members.

19. Apparatus for assembling clothes-pins, comprising loading means, transfer means disposed at right angles to said loading means and adapted to receive therefrom pairs of clamping members arranged in face-to-face relation, cam means disposed above said transfer means having gradually turned surfaces, said transfer means adapted to move said clamping members over the cam surfaces thereby turning said clamping members from their face-up position to a face-to-face position, and a conveyor belt conveying spring members to an assembly point for assembly with said clamping members.

20. Apparatus for assembling clothes-pins, comprising means for loading pairs of clamping members in face-up relation onto a transfer means, means located adjacent said transfer means having gradually turned surfaces, said transfer means adapted to move said clamping members over said surfaces thereby turning said clamping members from their face-up position to a face-to-face position, and means for conveying spring means for assembly with said clamping members.

21. A method of assembling clothes-pins, comprising transferring a pair of clamping members from a face-up position to a face-to-face position, conveying said face-to-face clamping members to an assembly station, conveying a spring member to the assembly station, and assembling said spring member with said clamping members.

22. A method of assembling clothes-pins, comprising conveying a pair of clamping members disposed in face-up position to a transfer station, transferring said clamping members over a cam station thereby moving said clamping members to a face-to-face position, transferring said face-to-face clamping members to an assembly station, conveying a spring member to said assembly station, and moving the ends of said clamping members into engagement with said spring member.

23. In a method of assembling clothes-pin clamping members with a spring member, comprising transferring a pair of the clamping members over a cam station, to move the clamping members from a face-up position to a face-to-face position.

24. A method of assembling clothes-pins, comprising transferring a pair of clamping members over a cam station, thereby moving the clamping members from a face-up position to a face-to-face position, conveying the face-to-face clamping members to an assembly station, conveying a spring member to said assembly station, and moving the ends of said clamping members into engagement with said spring member.

25. Apparatus for assembling clothes-pins, comprising means for conveying a spring member to an assembly station, said conveying means including a transfer bar, cam means reciprocating said transfer bar, ratchet means operatively connected to said transfer bar and rotated thereby, gear means secured for rotation with said ratchet means, and belt means operatively connected to said gear means and driven thereby, said belt means adapted to receive said spring member thereon for transfer to said assembly station.

26. Apparatus for assembling clothes-pins of the type including a spring member and a pair of clamping members, comprising means for transferring said spring member to a conveying means, means for intermittently driving said conveying means for conveying said spring member to an assembly station, means engaging said spring member at said assembly station for correctly positioning said spring member for assembly with a pair of said clamping members.

27. Apparatus for assembling clothes-pins as set forth in claim 26, wherein said means for intermittently driving said conveying means includes cam means, bar means reciprocated by said cam means, and ratchet means operatively connected to said bar means and rotated thereby, said ratchet means operatively connected to said conveying means for intermittently driving said conveying means.

28. Apparatus for assembling clothes-pins as set forth in claim 26, wherein said means engaging said spring member comprises an actuating head, means operatively connected to said actuating head for causing rotation thereof, and additional means operatively connected to said actuating head for causing vertical movement thereof.

29. In apparatus for assembling clothes-pins, a drive shaft, a cam unit operatively connected to said drive shaft and rotatable therewith, an actuating head and conveying means responsive to the movement of said cam unit, said cam unit rotating and vertically moving said actuating head and driving said conveying means with an intermittent motion.

30. In apparatus for assembling clothes-pins as set forth in claim 29, wherein said cam unit comprises a plurality of cams integrally joined together.

31. In apparatus for assembling clothes-pins of the type including a spring member and a pair of clamping members, a drive shaft, lever means operatively connected to said drive shaft, sliding means secured to said lever means, jaw means engaging said sliding means and slidable therewith, said jaw means engaging a spring member upon actuation of said sliding means, and transfer means adjacent said jaw means contacting said spring member as it is held by said jaw means and transferring said spring member onto a conveying means.

32. In apparatus for assembling clothes-pins, a drive shaft, a cam unit operatively connected to said drive shaft and rotatable therewith, said cam unit comprising a plurality of cams integrally joined together, conveying means for conveying a spring member to an assembly station, said conveying means operatively connected to one of said cams and intermittently driven thereby, an actuating head engaging said spring member at said assembly station, another of said cams rotating said actuating head in timed relation with the movement of said conveying means, another of said cams moving said actuating head vertically in timed relation with the movement of said conveying means, and means transferring a pair of clamping members to said assembly station for assembly with said spring member, said last-named means moving in timed relation to the movement of said conveying means.

33. In apparatus for assembling clothes-pins, a drive shaft, a first cam driven by said drive shaft, conveying means operatively connected to said first cam and intermittently driven thereby, a second cam driven by said drive shaft, an actuating head operatively connected to said second cam and being rotated thereby, and a third cam operatively connected to said actuating head for causing vertical movement thereof.

34. In apparatus for assembling clothes-pins of the type including a spring member and a pair of clamping members, means for transferring said clamping members to an assembly station, means for turning said clamping members from a face-up position to a face-to-face position as they are transferred to said assembly station, means for conveying a spring member to said assembly station for assembly with said clamping members, said conveying means conveying the assembled clothes-pin to a discharge station, and switch means adjacent said conveying means for stopping the operation of said transfer means and said conveying means if said assembled clothes-pin fails to drop from said conveying means at said discharge station.

35. In apparatus for assembling clothes-pins, means for moving a pair of clamping members to an assembly station, means adjacent said moving means for turning said clamping members from a face-up position to a face-to-face position as they are moved to said assembly station, transfer means for transferring a spring member onto a conveyor, said conveyor conveying said spring member to said assembly station for assembly with said clamping members.

36. In apparatus for assembling clothes-pins as set forth in claim 35, wherein said transfer means includes a pair of jaws for moving said spring member into a position adjacent said conveyor, and a transfer arm moving in timed relation with said conveyor for transferring said spring member onto said conveyor.

References Cited in the file of this patent

UNITED STATES PATENTS

| | | |
|---|---|---|
| 1,616,641 | Tainter | Feb. 8, 1927 |
| 1,829,651 | Henderson | Oct. 27, 1931 |
| 1,830,021 | Forney | Nov. 3, 1931 |
| 2,006,885 | DeMooy | July 2, 1935 |
| 2,142,438 | Faively | Jan. 3, 1939 |